(12) United States Patent
Sankaran et al.

(10) Patent No.: US 7,162,643 B1
(45) Date of Patent: Jan. 9, 2007

(54) METHOD AND SYSTEM FOR PROVIDING TRANSFER OF ANALYTIC APPLICATION DATA OVER A NETWORK

(75) Inventors: Mohan Sankaran, Union City, CA (US); Volodymyr Butsky, San Jose, CA (US); Sridhar C. Koritala, Fremont, CA (US); Zhenyu Tang, Fremont, CA (US)

(73) Assignee: Informatica Corporation, Redwood City, CA (US)

( * ) Notice: Subject to any disclaimer, the term of this patent is extended or adjusted under 35 U.S.C. 154(b) by 382 days.

(21) Appl. No.: 09/882,733

(22) Filed: Jun. 15, 2001

(51) Int. Cl.
*G06F 11/30* (2006.01)
*G06F 12/14* (2006.01)
*H04L 9/32* (2006.01)

(52) U.S. Cl. .................... 713/189; 375/752; 375/343; 365/189; 365/185; 369/275; 370/342; 370/503; 707/104

(58) Field of Classification Search ............. 705/50, 705/51; 713/189, 190; 375/752, 343; 365/189, 365/185; 369/275; 370/342, 503; 707/104
See application file for complete search history.

(56) References Cited

U.S. PATENT DOCUMENTS

| | | | |
|---|---|---|---|
| 5,403,147 A | 4/1995 | Tanaka | |
| 5,404,513 A | 4/1995 | Powers et al. | |
| 5,405,531 A | 4/1995 | Hitzman et al. | |
| 5,410,688 A | 4/1995 | Williams et al. | |
| 5,420,688 A | 5/1995 | Farah | |
| 5,455,945 A | 10/1995 | Vanderdrift | |
| 5,511,190 A | 4/1996 | Sharma et al. | |
| 5,519,859 A | 5/1996 | Grace | |
| 5,537,589 A | 7/1996 | Dalal | |
| 5,563,999 A | 10/1996 | Yaksich et al. | |
| 5,603,024 A | 2/1997 | Goldring | |
| 5,655,101 A | 8/1997 | O'Farrell et al. | |
| 5,675,785 A | 10/1997 | Hall et al. | |
| 5,689,566 A | 11/1997 | Nguyen .................... 380/25 |
| 5,692,181 A | 11/1997 | Anand et al. | |
| 5,706,495 A | 1/1998 | Chadha et al. | |
| 5,708,828 A | 1/1998 | Coleman | |
| 5,713,020 A | 1/1998 | Reiter et al. | |
| 5,721,903 A | 2/1998 | Anand et al. | |
| 5,721,911 A | 2/1998 | Ha et al. | |
| 5,778,355 A | 7/1998 | Boyer et al. | |
| 5,781,911 A | 7/1998 | Young et al. | |
| 5,787,415 A | 7/1998 | Jacobson et al. | |
| 5,794,030 A | 8/1998 | Morsi et al. | |
| 5,794,228 A | 8/1998 | French et al. | |
| 5,794,229 A | 8/1998 | French et al. | |
| 5,794,246 A | 8/1998 | Sankaran et al. | |
| 5,799,310 A | 8/1998 | Anderson et al. | |
| 5,806,060 A | 9/1998 | Borgida et al. | |

(Continued)

FOREIGN PATENT DOCUMENTS

EP 0967868 A3 3/2000

(Continued)

OTHER PUBLICATIONS

Microsoft Computer Dictionary 4th ed. (1999). Microsoft corporation, Redmond, WA. pp. 64-65.*

(Continued)

*Primary Examiner*—James A Reagan

(57) ABSTRACT

A method and system providing a high speed and secure data link for moving large amounts of data across a network, such as the data used in an analytic application. Featured are simultaneous compression and encryption of the data, as well as means for recovery in the event the network connection is lost.

32 Claims, 9 Drawing Sheets

U.S. PATENT DOCUMENTS

| | | |
|---|---|---|
| 5,822,751 A | 10/1998 | Gray et al. |
| 5,826,258 A | 10/1998 | Gupta |
| 5,832,496 A | 11/1998 | Anand et al. |
| 5,842,213 A | 11/1998 | Odom et al. |
| 5,848,415 A | 12/1998 | Guck |
| 5,854,890 A | 12/1998 | Ramachandran et al. |
| 5,857,197 A | 1/1999 | Mullins |
| 5,870,746 A | 2/1999 | Knutson et al. |
| 5,870,747 A | 2/1999 | Sandaresam |
| 5,873,102 A | 2/1999 | Bridge, Jr. et al. |
| 5,884,262 A | 3/1999 | Wise et al. |
| 5,898,431 A | 4/1999 | Bayles et al. |
| 5,915,019 A | 6/1999 | Ginter et al. |
| 5,933,796 A | 8/1999 | Ashida et al. |
| 5,982,890 A | 11/1999 | Akatsu |
| 5,987,454 A | 11/1999 | Hobbs |
| 5,991,742 A | 11/1999 | Tran |
| 6,002,402 A | 12/1999 | Schacher |
| 6,003,024 A | 12/1999 | Bair et al. |
| 6,014,670 A | 1/2000 | Zamanian et al. |
| 6,026,388 A | 2/2000 | Liddy et al. |
| 6,032,145 A | 2/2000 | Beall et al. |
| 6,032,158 A | 2/2000 | Mukhopadhyay et al. |
| 6,044,374 A | 3/2000 | Nesamoney et al. |
| 6,065,007 A | 5/2000 | Muthukrishanan et al. |
| 6,078,994 A * | 6/2000 | Carey ..................... 711/133 |
| 6,119,167 A | 9/2000 | Boyle et al. |
| 6,122,628 A | 9/2000 | Castelli et al. |
| 6,128,624 A | 10/2000 | Papierniak et al. |
| 6,141,699 A | 10/2000 | Luzzi et al. |
| 6,151,584 A | 11/2000 | Papierniak et al. |
| 6,151,601 A | 11/2000 | Papierniak et al. |
| 6,173,310 B1 | 1/2001 | Yost et al. |
| 6,192,364 B1 | 2/2001 | Baclawski |
| 6,205,472 B1 | 3/2001 | Gilmour |
| 6,208,990 B1 | 3/2001 | Suresh et al. |
| 6,216,125 B1 | 4/2001 | Johnson |
| 6,233,575 B1 | 5/2001 | Agrawal et al. |
| 6,262,598 B1 | 7/2001 | Cairns et al. |
| 6,269,336 B1 | 7/2001 | Ladd et al. |
| 6,269,369 B1 | 7/2001 | Robertson |
| 6,272,485 B1 | 8/2001 | Sragner |
| 6,292,657 B1 | 9/2001 | Laursen et al. |
| 6,308,203 B1 | 10/2001 | Itabashi et al. |
| 6,336,137 B1 | 1/2002 | Lee et al. |
| 6,339,775 B1 | 1/2002 | Zamanian et al. |
| 6,369,840 B1 | 4/2002 | Barnett et al. |
| 6,385,604 B1 | 5/2002 | Bakalash et al. |
| 6,393,386 B1 | 5/2002 | Zager et al. |
| 6,404,884 B1 | 6/2002 | Marwell et al. |
| 6,408,292 B1 | 6/2002 | Bakalash et al. |
| 6,411,936 B1 | 6/2002 | Sanders |
| 6,418,200 B1 | 7/2002 | Ciccolella et al. |
| 6,421,781 B1 | 7/2002 | Fox et al. |
| 6,424,426 B1 | 7/2002 | Henry |
| 6,430,624 B1 | 8/2002 | Jamtgaard et al. |
| 6,438,552 B1 | 8/2002 | Tate |
| 6,446,059 B1 | 9/2002 | Berger et al. |
| 6,446,062 B1 | 9/2002 | Levine et al. |
| 6,446,096 B1 | 9/2002 | Holland et al. |
| 6,449,619 B1 | 9/2002 | Colliat et al. |
| 6,457,030 B1 | 9/2002 | Adams et al. |
| 6,466,969 B1 | 10/2002 | Bunney et al. |
| 6,477,525 B1 | 11/2002 | Bello et al. |
| 6,480,711 B1 | 11/2002 | Guedalia |
| 6,487,584 B1 | 11/2002 | Bunney |
| 6,491,304 B1 | 12/2002 | Sato et al. |
| 6,493,800 B1 | 12/2002 | Blumrich |
| 6,502,101 B1 | 12/2002 | Verprauskus et al. |
| 6,526,335 B1 | 2/2003 | Treyz et al. |
| 6,535,872 B1 | 3/2003 | Castelli et al. |
| 6,539,359 B1 | 3/2003 | Ladd et al. |
| 6,549,910 B1 | 4/2003 | Tate |
| 6,549,937 B1 | 4/2003 | Auerbach et al. |
| 6,553,366 B1 | 4/2003 | Miller et al. |
| 6,563,912 B1 | 5/2003 | Dorfman et al. |
| 6,564,264 B1 | 5/2003 | Creswell et al. |
| 6,574,599 B1 | 6/2003 | Lim et al. |
| 6,581,062 B1 | 6/2003 | Draper et al. |
| 6,601,062 B1 | 7/2003 | Deshpande et al. |
| 6,616,701 B1 | 9/2003 | Doyle |
| 6,629,102 B1 | 9/2003 | Malloy et al. |
| 6,631,497 B1 | 10/2003 | Jamshidi et al. |
| 6,636,870 B1 | 10/2003 | Roccaforte |
| 6,671,689 B1 | 12/2003 | Papierniak |
| 6,721,728 B1 | 4/2004 | McGreevy |
| 6,736,870 B1 | 5/2004 | Best et al. |
| 2002/0035565 A1 | 3/2002 | Shah et al. |
| 2002/0056081 A1* | 5/2002 | Morley et al. ............ 725/1 |
| 2002/0059267 A1 | 5/2002 | Shah et al. |
| 2002/0077787 A1 | 6/2002 | Rappaport et al. |
| 2002/0099691 A1 | 7/2002 | Lore et al. |
| 2002/0112237 A1 | 8/2002 | Keits |
| 2002/0161770 A1 | 10/2002 | Shapiro et al. |
| 2002/0172247 A1 | 11/2002 | Bayer et al. |

FOREIGN PATENT DOCUMENTS

| | | |
|---|---|---|
| EP | 1043671 A2 | 10/2000 |
| EP | 1164511 A2 | 12/2001 |
| GB | 2350758 | 12/2000 |
| GB | 2357596 | 6/2001 |
| WO | WO 99/24922 | 5/1999 |
| WO | WO 00/04466 | 1/2000 |
| WO | WO 00/08581 | 2/2000 |
| WO | WO 00/77707 | 12/2000 |
| WO | WO 01/18728 | 3/2001 |
| WO | WO 01/20438 | 3/2001 |
| WO | WO 01/24040 | 5/2001 |
| WO | WO 02/44953 | 6/2002 |

OTHER PUBLICATIONS

Seshardri P. et al: "SQLServer for Windows CE-a database engine for mobile and embedded platforms" data engineering, 2000. Proceedings 16th International Conference on San Diego CA USA Feb. 29-Mar. 3, 2000, Los A, USA IEEE Comput. Soc. US, Feb. 29, 2000, pp. 642-644, XP010378761 ISBN 0-7695-0506-6 the whole document.

24X7 The Magazine of Nonstop Computing, "Compaq's Zero Latency Enterprise Initiative," vol. 1, No. 2, Oct. 2000, pp. 1-25.

"A Process for Selective Routing of Servlet Transcoding Modules," IBM Technical Disclosure Bulletin, vol. 42, Issue 422, Jun. 1999 UK.

Multi-Modal Data Access Research Disclosure, Kenneth Mason Publications, Hampshire, GB, No. 426, Oct. 1999, pp. 133-1386.

"Parameterized XSL Style Sheets," Research Disclosure, vol. 42, No. 423, Jul. 1, 1999, Havant, UK, Article No. 423110.

Anand, V. J. et al. "Data Warehouse Architecture for DDS Applications," Australian Journal of Information Systems, Sep. 1996, AJIS Publishing, Australia, vol. 4, No. 1, pp. 43-53.

Ballinger, C. et al., "Born to be Parallel, Why Parallel Origins Give Teradata an Enduring Performance Edge," Bulletin of the Technical Committee on Data Engineering, vol. 20, No. 2, Jun. 1997, IEEE Comput. Soc., Los Alamitos, CA, US.

Barrett, R. et al., "Intermediaries: An Approach to Manipulating Information Streams," IBM Systems Journal, IBM Corp., Armonk, New York, U.S. vol. 38, No. 4, 1999, pp. 629-641.

Bellatreche, L. et al., "OLAP Query Processing for Partitioned Data Warehouses," Proceedings 1999 Int'l. Symposium on Database Applications in Non-Traditional Environments (Dante'99) (CAT No. PR00496), Kyoto, JP, Nov. 28-30, 1999, pp. 35-42, IEEE Comput. Soc., Los Alamitos, CA US ISBN: 0-7695-0496-5.

Bello, R.G. et al., "Materialized Views in Oracle," Proceedings of the Int'l. Conf. On Very Large Data Bases, NY, Aug. 24, 1998, pp. 659-664.

Chamberlin, D. et al., "A Complete Guide to DB2 Universal Database," 1992, pp. 659-600.

Chan, R. "12 Steps of Creating a Successful Data Warehouse," Proceedings of the 8th International Database Workshop (Industrial Volume), Proceedings of the 8th International Hong Kong Computer Society Database Workshop, Data Mining, Data Warehousing and CLI, pp. 227-248, ISBN 981-3083-53-0, 1997, Singapore, Springer-Verlag Singapore, Singapore.

Chaudhuri, S. et al., "An Overview of Data Warehousing and OLAP Technology," SIGMOD Record, Sigmod, New York, No. US, vol. 2, No. 1, Mar. 1997, pp. 65-74.

Curley, K. et al., "The Rationale for Developing a Corporate Data Warehouse and the Development of a Model for Sharing Data in a Data Warehouse Environment." ODIS '95. 1995 International Conference on Object Oriented Information Systems Proceedings, Proceedings of 1995, International Conference on Object Oriented Information Systems, Dublin, Ireland, Dec. 18-20, 1995, pp. 351-366, Berlin, Germany, Springer-Verlag, Germany.

Datta, A., et al., "A Case for Parallelism in Data Warehousing and OLAP," Ninth Int'l. Workshop on Database and Expert Systems Applications, Vienna, AT, IEEE Comput. Soc., Los Alamitos, CA, US, Aug. 26, 1998, pp. 226-231.

Dawson, F. et al., "RFC 2426 vCard MIME Directory Profile," Network Working Group, Request for Comments 2426, Sep. 1998.

Deutsch, A. et al., "Storing Semistructured Data with STORED," ACM SIGMOD Record, Proceedings of the 1999 ACM SIGMOD International Conference on Management of Data, Jun. 1999, vol. 28, Issue 2.

Duncan, K., et al., "Optimizing the Data Warehousing Environment for Change: the Persistent Staging Area," Cutter IT Journal, Jun. 1999, Cutter Inf. Corp. USA, vol. 12, No. 6, pp. 28-35.

Fernandez, M. et al., "SilkRoute: Trading Between Relations and XML," WWW9/Computer Networks, 33(1-6), pp. 723-745, 2000.

Florescu, D. et al., "A Performance Evaluation of Alternative Mapping Schemes for Storing SML in a Relational Database," Technic Report 3680, INRIA, 1999.

Freytag, C. et al., "Resource Adaptive WWW access for Mobile Applications," Computers and Graphics, Pergamon Press Ltd., Oxford, GB, vol. 23, No. 6, Dec. 1999, pp. 841-848.

Fry, J.P., "Conversion Technology, An Assessment," ACM SIGMIS Database, vol. 12-13, No. 4-1, Jul. 1981, pp. 39-61.

Hammer, J. et al., "Extracting Semistructured Information From the Web," Proceedings of the Workshop on Management of Semi-structured Data, Mar. 16, 1997, pp. 1-25.

Hori, M. et al., "Annotation-Based Web Content Transcoding," Computer Networks, Elsevier Science Publishers B.V., Amsterdam NL., vol. 33, No. 106, Jun. 2000, pp. 197-211.

Housel, B. et al., "A High-Level Data Manipulation Language for Hierarchical Data Structures," International Conference on Management of Data, 1976, pp. 155-169.

Informatica Press Releases, "Informatica Delivers Industry's First Synchronized Data Marts With Newest Version of Powermart Suite," <http://www.informatica.com/syndata—072798.html>, pp. 1-4, May 27, 1997.

Informatica Press Releases, "Informatica Unveils Architecture for Networking Multiple Data Marts Into an Enterprise-Wide Data Warehouse," <http://www.informatica.com/edm—082697.html>, pp. 1-4, Aug. 26, 1997.

Jaczynski, M. et al., "Broadway: A Case-Based System for Cooperative Information Browsing on the World Wide Web," Collaboration Between Human and Artificial Societies, Online 1999.

Jones, K., "An Introduction to Data Warehousing: What are the Implications for the Network," 1998, International Journal of Network Management, vol. 8, pp. 42-56.

Juhne, J., et al., "Ariadne: A Java-Based Guided Tour System for The World Wide Web," Computer Networks and ISDN Systems, North Holland Publishing, Amsterdam, NL, vol. 30, No. 107, Apr. 1, 1998, pp. 131-139.

Kim, W., "On Optimizing an SQL-Like Nested Query," ACM Transactions on Database Systems, Association for Computing Machinery, New York, US, vol. 7, No. 3, Sep. 1, 1982, pp. 443-469.

Kitayama, F. et al., "Design of a Framework for Dynamic Content Adaptation to Web-enabled Terminals and Enterprise Applications," Software Engineering Conference, 1999. Proceedings Sixth Asian Pacific Takamatsu, Japan, Dec. 7-10, 1999, Los Alamitos, CA, US.

Kovacs, L. et al., "Aqua: An Advanced User Interface for the Dienst Digital Library System," 8th Delos Workshop: User Interfaces for Digital Libraries, Online, Oct. 21-23, 1998, Sweden, p. 2.

Lum, V.Y. et al., "A General Methodology for Data Conversion and Restructuring," IBM Journal of Research and Development, IBM Corporation, Armonk, US, vol. 20, No. 5, Sep. 1, 1976, pp. 483-497.

Makpangou, M. et al., "Replicated Directory Service for Weakly Consistent Distributed Caches," INRIA SOR group-78143 Le Chesnay Cedex, France.

Mohania, M. et al.: "Advances and Research Directions in Data Warehousing Technology," Ajis, Australian Journal of Information Systems, Wollongong, Au. vol. 7, No. 1, Sep. 1999, pp. 41-59.

Mumick, I. S. et al. "Maintenance of Data Cubes and Summary Tables in a Warehouse," SIGMOD 1997. ACM SIGMOD International Conference on Management of Data, Tucson, AZ, USA, May 13-15, 1997, vol. 26, No. 2, pp. 100-111, XP002074807, Jun. 1997, ACM, USA.

Mumick, I.S., "Magic is Relevant," Sigmod Record, Sigmod, New York, NY, US, vol. 19, No. 2, Jun. 1, 1990, pp. 247-258.

Rodriguez, J. et al., "IBM WebSphere Transcoding Publisher V1:1: Extending Web Applications to the Pervasive World," <http://ibm.com/redbooks>, Jul. 2000, pp. 1039.

Rousskov, A. et al., "Cache Digests," Computer Networks and ISDN Systems, 30 (1998) 2144-2168.

Roy, P. et al., "Don't Trash Your Intermediate Results, Cach'em," Technical Report, Online, Mar. 2, 2000, pp. 1-22.

Shneiderman, B. et al., "An Architecture for Automatic Relational Database System Conversion," ACM Transactions on Databases Systems, vol. 7, No. 2, 1982.

Schneier, B., "Applied Cryptography, Second Edition," 1996, pp. 189-196, 226-227.

Shanmugasundaram, J. et al., "Relational Databases for Querying SML Documents Limitations and Opportunities," Proc. Of VLDB, pp. 302-314, 1999.

Seshadri, P. et al., "SQLServer for Windows CE-A Database Engine For Mobile And Embedded Platforms," Data Engineering 2000. Proceedings 16th International Conference in San Diego, CA, US, Feb. 29, 2000, IEE Computer Soc., US, Feb. 29, 2000, pp. 642-644.

Shimura, T. et al., "Storage and Retrieval of XML Documents Using Object-Relational Databases," Proc. Of DEXA, pp. 206-217, 1999.

Shu, N. et al., "Convert: A High Level Translation Definition Language for Data Conversion," Communications of the ACM, vol. 18, No. 10, Oct. 1975, pp. 557-567.

Shu N. et al., "Convert: A High Level Transition Definition Language for Data Conversion," Proceedings of the 1975 ACM SIGMOD International Conference on Management of Data, May 1975, p. 111.

Shu, N. et al., "Express: A Data EXtraction, Processing, and REStructuring System," ACM Transactions on Database Systems, vol. 2, No. 2, Jun. 1977, pp. 134-174.

Shu, N., "Automatic Data Transformation and Restructuring," IEEE, 1987, pp. 173-180.

Squire, C., "Data Extraction and Transformation for the Data Warehouse," ACM Proceedings of SIGMOD. International Conf. On Management of Data, vol. 24, No. 1, Mar. 1, 1995, p. 446.

Weyman, P.J., "The Case for a Process-Driven Approach to Data Warehousing," Database and Network Journal, A.P. Publications, London, FB, vol. 27, No. 1, Feb. 1, 1997, pp. 3-6.

White, C., "Data Warehousing: Cleaning and Transforming Data," INFO DB, vol. 10, No. 6, Apr. 1997, pp. 11-12.

White, C., "Managing Data Transformations," byte, McGraw-Hill Inc., St. Peterborough US, vol. 22, No. 12, Dec. 1, 1997, pp. 53-54.

Informatica Corporation, Release Notes, PowerCenter 1.6, PowerMart 4.6, Aug. 1999, pp. 1-30.

Informatica Corporation, User Guide, PowerCenter 1.6, PowerMart 4.6, Jul. 1999, pp. i-xxvii and 144-186 (Table of Contents, Preface, Chapters 6 & 7).

* cited by examiner

METHOD AND SYSTEM FOR PROVIDING TRANSFER OF ANALYTIC APPLICATION DATA OVER A NETWORK

FIELD OF THE INVENTION

The invention relates generally to computer system networks, and more particularly, to securing rapid, reliable, and private communication between networked computers in a multiple data warehouse/analytic application environment.

BACKGROUND OF THE INVENTION

Computers are used to perform a wide variety of applications in such diverse fields as finance, traditional and electronic commercial transactions, manufacturing, health care, telecommunications, etc. Most of these applications typically involve inputting or electronically receiving data, processing the data according to a computer program, then storing the results in a database, and perhaps transmitting the data to another application, messaging system, or client in a computer network. As computers become more powerful, faster, and more versatile, the amount of data that can be processed also increases.

Unfortunately, the raw data found in operational databases often exist as rows and columns of numbers and codes which, when viewed by individuals, appears bewildering and incomprehensible. Furthermore, the scope and vastness of the raw data stored in modern databases is overwhelming to a casual observer. Hence, applications were developed in an effort to help interpret, analyze, and compile the data so that it may be readily and easily understood by a human. This is accomplished by sifting, sorting, and summarizing the raw data before it is presented for display, storage, or transmission. Thereby, individuals can now interpret the data and make key decisions based thereon.

Extracting raw data from one or more operational databases and transforming it into useful information (e.g., data "warehouses" and data "marts") is the function of analytic applications. In data warehouses and data marts, the data are structured to satisfy decision support roles rather than operational needs. A data warehouse utilizes a business model to combine and process operational data and make it available in a consistent way. Before the data are loaded into the data warehouse, the corresponding source data from an operational database are filtered to remove extraneous and erroneous records; cryptic and conflicting codes are resolved; raw data are translated into something more meaningful; and summary data that are useful for decision support, trend analysis and modeling or other end-user needs are pre-calculated. A data mart is similar to a data warehouse, except that it contains a subset of corporate data for a single aspect of business, such as finance, sales, inventory, or human resources.

In the end, the data warehouse or data mart is comprised of an "analytical" database containing extremely large amounts of data useful for direct decision support or for use in analytic applications capable of sophisticated statistical and logical analysis of the transformed operational raw data. With data warehouses and data marts, useful information is retained at the disposal of the decision makers and users of analytic applications and may be distributed to data warehouse servers in a networked system. Additionally, decision maker clients can retrieve analytical data resident on a remote data warehouse servers over a computer system network.

An example of the type of company that would use data warehousing is an online Internet bookseller having millions of customers located worldwide whose book preferences and purchases are tracked. By processing and warehousing these data, top executives of the bookseller can access the processed data from the data warehouse, which can be used for sophisticated analysis and to make key decisions on how to better serve the preferences of their customers throughout the world.

The rapid increase in the use of networking systems, including Wide Area Networks (WAN), the Worldwide Web and the Internet, provides the capability to transmit operational data into database applications and to share data contained in databases resident in disparate networked servers. For example, vast amounts of current transactional data are continuously generated by business-to-consumer and business-to-business electronic commerce conducted over the Internet. These transactional data are routinely captured and collected in an operational database for storage, processing, and distribution to databases in networked servers.

The expanding use of "messaging systems" and the like enhances the capacity of networks to transmit data and to provide interoperability between disparate database systems. Messaging systems are computer systems that allow logical elements of diverse applications to seamlessly link with one another. Messaging systems also provide for the delivery of data across a broad range of hardware and software platforms, and allow applications to interoperate across network links despite differences in underlying communications protocols, system architectures, operating systems, and database services. Messaging systems and the recent development of Internet access through wireless devices such as enabled cellular phones, two-way pagers, and hand-held personal computers, serve to augment the transmission and storage of data and the interoperability of disparate database systems.

In the current data warehouse/data mart networking environment, one general concern involves the sheer volume of data that must be dealt with. Often massive, multi-terabyte data files are stored in various server sites of data warehouses or in operational databases. Transmitting these massive amounts of data over WANs or the Internet is a troublesome task. The time needed to move the data is significant, and the probability that the data may contain an error introduced during transmission is increased. Also, the data are also vulnerable to interception by an unauthorized party. Furthermore, when the connection is lost in the process of transmitting the data over a network, there often is a need to retransmit large amounts of data already transmitted prior to the loss of connection, further increasing the time needed to move the data.

Accordingly, there is a need for a reliable, secure, authenticated, verifiable, and rapid system and/or method for the transmission of huge amounts of data, such as data in a data warehouse/mart, over networks such as WANs and the Internet. The present invention provides a novel solution to this need.

SUMMARY OF THE INVENTION

The present invention satisfies a currently unmet need in a networked data warehouse/analytic application environment to provide a method and system that provide reliable, secure, authenticated, verifiable, and rapid system and method for the transmission of huge amounts of data over a network (e.g., operational data, and transformed data in a data warehouse/data mart). The data can be moved from a source to a target (e.g., from a server to a client, or from a client to a server) in the computer system network. The source represents any centralized source on the network, while the target can represent a remotely located device (e.g., at a customer site) or a local device (e.g., a device in communication with the source via a local area network).

In one embodiment, in a source (e.g., server) computer system, an incoming request is received from a target (e.g., client) for a large amount of data (e.g., a data file) resident in a mass storage unit on the server, for example. The incoming request is authenticated and is then used to spawn a session thread between the server and the client. The incoming request includes a command that, in one embodiment, uses Extensible Markup Language (XML). The command is parsed and translated into a set of tasks which can be executed by the server as part of the session thread.

In one embodiment, the data are separated into blocks, and each block is sequentially compressed and encrypted, then sent to the client. In one embodiment, the blocks are processed in parallel, saving time. The transfer of the data to the client is checked to make sure it is complete and accurate.

On the client side, the session thread between the server and client is spawned in response to a message from the server. The compressed and encrypted data blocks are received from the server, then decompressed, decrypted, and assembled into the requested data.

The present invention provides a recovery mechanism for automatically or manually restoring a connection between the server and client when the connection is lost. As part of the recovery mechanism, data transfer is resumed from the point where it was terminated when the connection was lost, so that previously transmitted data do not have to be retransmitted.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
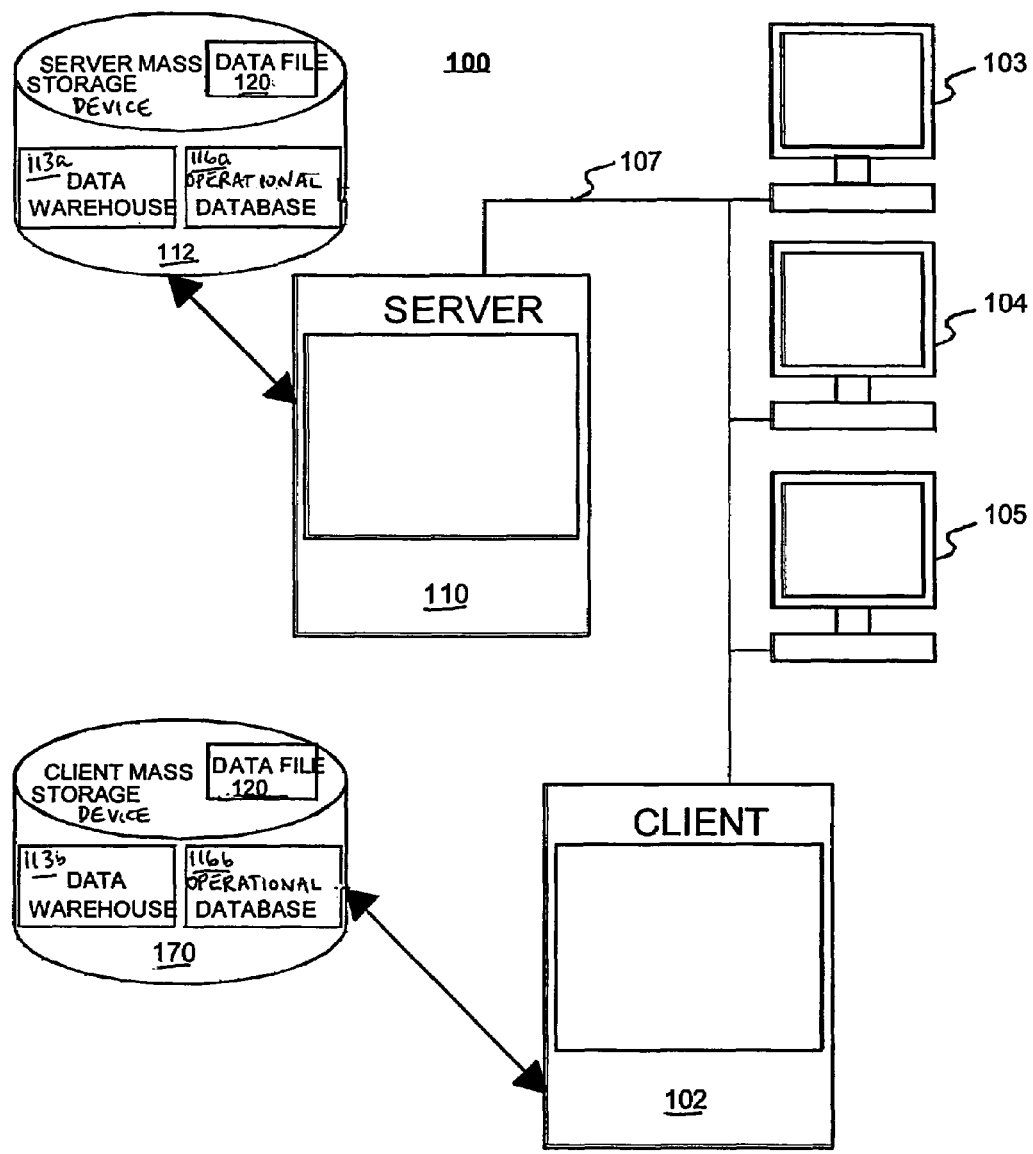
FIG. 1A illustrates a schematic block diagram of an exemplary client/server computer system network upon which embodiments of the present invention may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as sessions, objects, blocks, parts, threads, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "establishing," "issuing," "authenticating," "spawning," "transmitting," "accumulating," "restoring," "resuming," "translating," "storing," "executing," "receiving," "writing," "compressing," "decompressing," "encrypting," "decrypting," "sending," "verifying," or the like, refer to actions and processes (e.g., processes 700 and 750 of FIGS. 7A and 7B, respectively) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

FIG. 1A illustrates a block diagram of client/server computer system network 100 upon which embodiments of the present invention may be practiced. This server/client system 100 is made up of server computer system 110 (e.g., Unix or NT server computer), client computer system 102, and remote computer systems 103–105, (e.g., personal computers, laptop computers, workstations, terminals, etc.) which may be used to access the information accessible to server computer system 110. Server 110 can represent any centralized source on the network 100, while client 102 and remote computer systems 103–105 can represent a remotely located device (e.g., at a customer site) or a local device (e.g., a device in communication with server 110 via a local area network).

Each remote computer system 103–105 has its own physical memory system (e.g., hard drive, random access memory, read only memory, etc.) for storing and manipulating data. Client computer system 102, server computer system 110, and remote computer systems 103–105 are connected for intercommunication and transfer of data by network bus 107. However, it is appreciated that these devices may instead by coupled in a wireless network.

Server computer system 110 is coupled to server mass storage device 112 that is or is not accessible by client computer system 102 and computer terminals 103–105 through network bus 107 directly. Client system 102 also has its own client mass storage device 170. The present invention includes threads and objects within the application software that are executed by server computer system 110 and/or client system 102 to transfer data therebetween (refer to FIG. 2B, below).

Located within mass storage device 112 is operational database 116a, which receives and stores the current raw data for a data mart or data warehouse. Raw data received and stored within operational database 116a are transformed by an analytic application into information that is more meaningful for decision support. Data marts/warehouses 113a, located within mass storage device 112, include transformed data processed by the analytic application. It is important to point out that data marts/warehouses 113a and operational database 116a could each reside within a separate mass storage devices and each mass storage device could be connected by network bus 107 to a separate server.

A data file 120 is a file stored within either operational database 116a, within the database of data warehouse/data mart 113b, or elsewhere in server mass storage device 112. In accordance with the present invention, data file 120 is securely, quickly and reliably transmitted over network bus 107 to client computer system 102 or to remote computer systems 103–105 for display or storage on these systems or for use in analytic applications resident on these systems. Data file 120 is a large file containing, for example, operational data such as customer data or third party data. Data file 120 may instead contain data transformed according to an analytic application. It is appreciated that the present invention also can be used to transmit a data stream from server computer system 110 to a target device (e.g., client computer system 102 or to remote computer systems 103–105).

Operational database 116b and data warehouse 113b are also shown residing within client mass storage device 170. A data file 120 is shown also residing in client mass storage device 170 to represent the transmission and receipt of the data file as mentioned in the preceding paragraph. It is appreciated that the present invention can likewise be used to transmit a data is file (or a data stream) from client 102 to server 110, or from these devices to any other device on network 100. Generally speaking, the present invention can be used to transmit a data file or a data stream from a source device to a target device. For simplicity of discussion, the present invention is described in the context of a transfer of a data file from a server to a client.

Figure 1B:
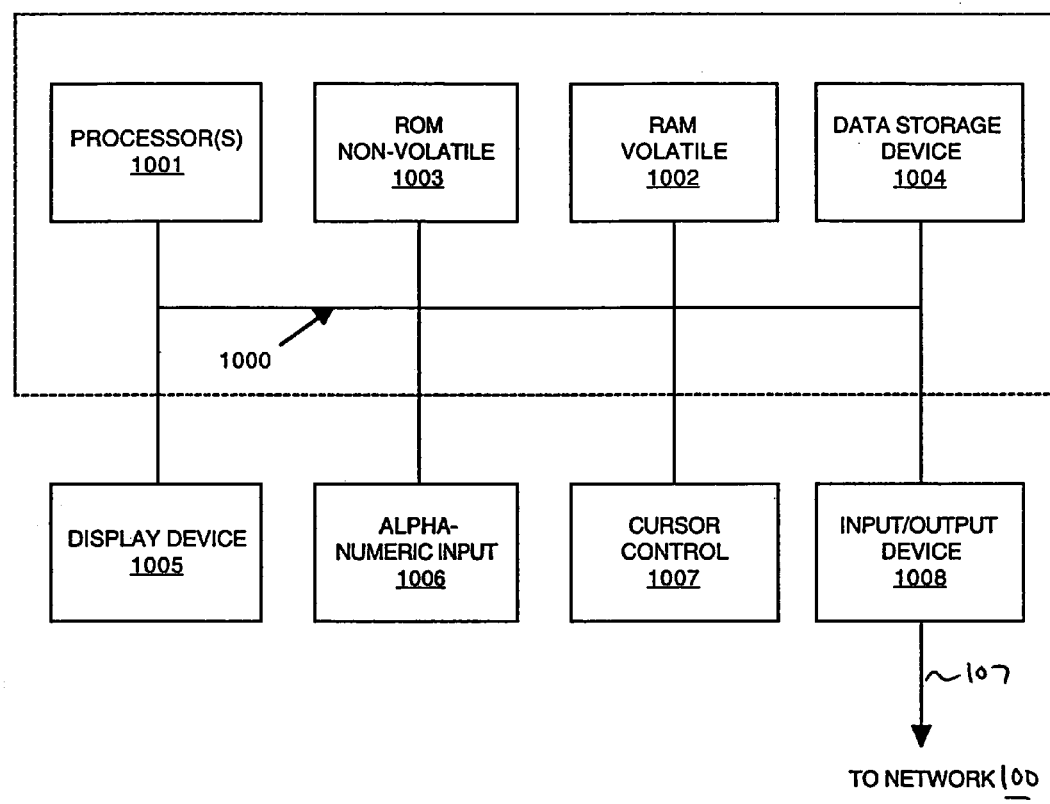
FIG. 1B illustrates an exemplary computer system upon which embodiments of the present invention may be practiced.

Refer now to FIG. 1B, which illustrates an exemplary computer system 1090 upon which embodiments of the present invention may be practiced. Computer system 1090 exemplifies server 110, client 102, and remote computer systems 103–105 of FIG. 1A.

In general, computer system 1090 of FIG. 1B comprises bus 1000 for communicating information, one or more processors 1001 coupled with bus 1000 for processing information and instructions, random access (volatile) memory (RAM) 1002 coupled with bus 1000 for storing information and instructions for processor 1001, read-only (non-volatile) memory (ROM) 1003 coupled with bus 1000 for storing static information and instructions for processor 1001, data storage device 1004 such as a magnetic or optical disk and disk drive coupled with bus 1000 for storing information and instructions, an optional user output device such as display device 1005 coupled to bus 1000 for displaying information to the computer user, an optional user input device such as alphanumeric input device 1006 including alphanumeric and function keys coupled to bus 1000 for communicating information and command selections to processor 1001, and an optional user input device such as cursor control device 1007 coupled to bus 1000 for communicating user input information and command selections to processor 1001. Furthermore, an optional input/output (I/O) device 1008 is used to couple computer system 1090 onto, for example, a network.

Display device 1005 utilized with computer system 1090 may be a liquid crystal device, cathode ray tube, or other display device suitable for creating graphic images and alphanumeric characters recognizable to the user. Cursor control device 1007 allows the computer user to dynamically signal the two-dimensional movement of a visible symbol (pointer) on a display screen of display device 1005. Many implementations of the cursor control device are known in the art including a trackball, mouse, joystick or special keys on alphanumeric input device 1006 capable of signaling movement of a given direction or manner of displacement. It is to be appreciated that the cursor control 1007 also may be directed and/or activated via input from the keyboard using special keys and key sequence commands. Alternatively, the cursor may be directed and/or activated via input from a number of specially adapted cursor directing devices.

Figure 2A:
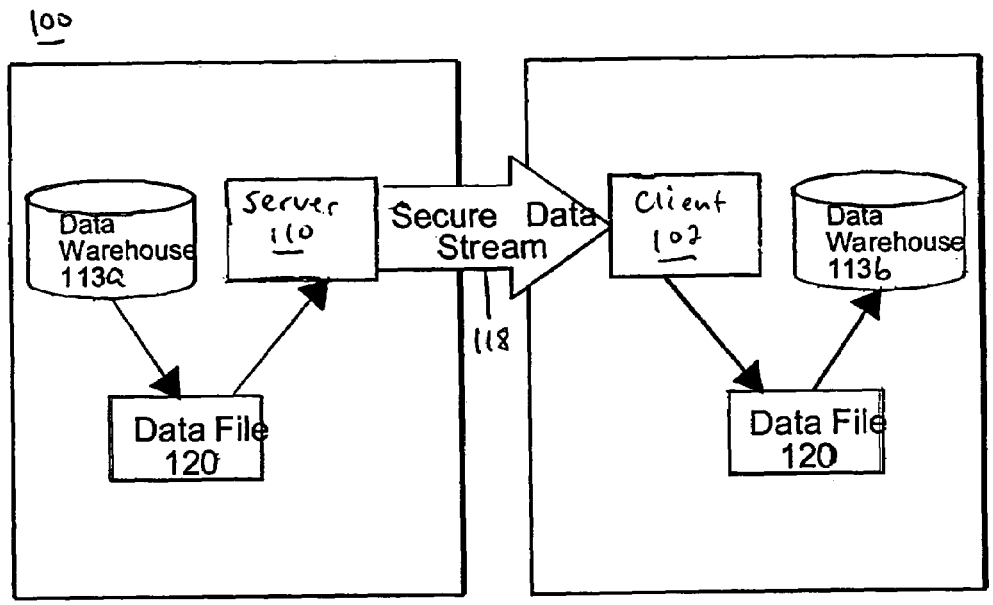
FIG. 2A illustrates a general functional block diagram of a computer system network in accordance with one embodiment of the present invention.

FIG. 2A illustrates a functional block diagram of an embodiment of the client/server computer system network 100 of FIG. 1A in accordance with one embodiment of the present invention. In this embodiment, with reference also to FIG. 1A, the present invention provides a secure data stream 118 that transfers data file 120 from server computer system 110 to client computer system 102. Data file 120 is originally resident in data warehouse 113a or operational database 116a in server mass storage device 112, and is transmitted to client mass storage device 170.

For simplicity of discussion, communication is shown as occurring from server 110 to client 102; however, it is appreciated that communication can similarly occur from client 102 to server 110. In this latter case, the arrows indicating the direction of data flow would be in the opposite direction, the "output channel" would refer to the channel on client 102, and the "input channel" would refer to the channel on server 110.

Figure 2B:
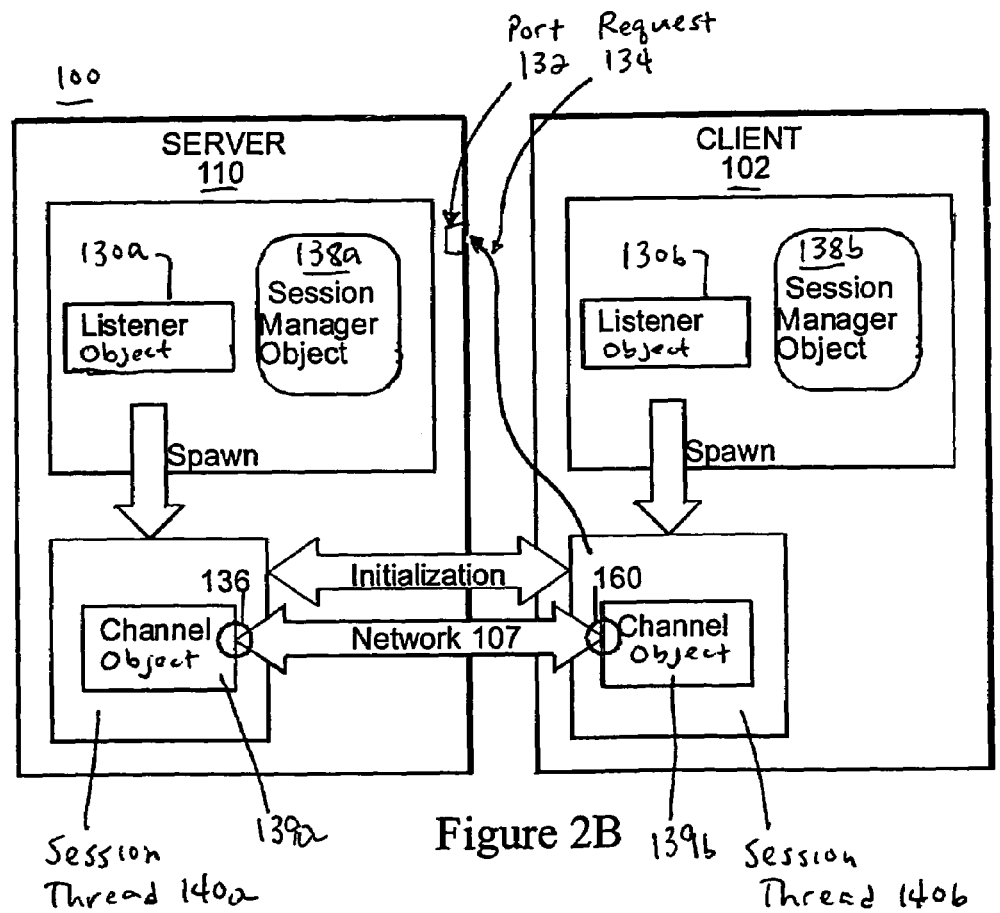
FIG. 2B illustrates a more detailed functional block diagram of the computer system network generally illustrated in FIG. 2A.

FIG. 2B is a functional block diagram providing additional details of the client/server computer system network 100 in accordance with one embodiment of the present invention. Listener object 130a is designed to receive an incoming connection request and to spawn a session thread 140a in response (specifically, listener object 130a calls session manager object 138a to create session thread 140a). Server listener object 130a receives, at a well known port 132, an incoming request 134 from client computer system 102. In the present embodiment, the request 134 is generated in the session thread 140b executing on client 102. The request 134 is a request to establish a client socket connection 136 and to transmit data from server mass storage device 112 (e.g., data file 120) to client computer system 102.

A request 134 may be received from a remote device on the network 100, or from a local device. That is, for example, a request 134 may be received over the Internet from a device that is outside of a firewall or a company's intranet (e.g., a local area network), or the request 134 may be from a local device within the company's intranet. However, in the present embodiment, instead of trying to determine the source of request 134, all requests are delivered/received in encrypted form.

In the present embodiment, all computers in the network 100 are considered as non-secure. All keys are stored in encrypted form, with a password-based encryption algorithm used to encrypt and decrypt keys.

All registered users seeking to implement the data retrieval process of the present invention have their own account. Keys for each account are stored in separate files. Each file has the name of the account and is encrypted using the account password. All registered account keys are stored in a central repository (not shown) and are encrypted using a repository password. In the present embodiment, the repository is initialized with a single password hidden and secured by an administrator password. The repository password is used for all secured (encrypted) objects.

The central repository resides in main memory of the server 110 (and likewise, a central repository resides in main memory of client 102). The central repository has the capability to encrypt any stored object using pass word-based encryption. In one embodiment, the central repository asks the object if it needs encryption.

In the present embodiment, there are three repository object types: an object to represent an account, an object that represents a repository password for the administrative account, and an object to represent each session instance for recovery purposes. The object representing an account contains a key (or password) that is used to establish a secure connection between client 102 and server 110 of FIGS. 2A and 2B. The object representing the repository password for the administrative account is used to gain access to all repository objects, and is secured with an administrator account password. The object representing each session instance contains all needed information for session recovery (refer to FIGS. 6A, 6B and 6C, below).

With reference again to FIG. 2B, in the present embodiment, listener object 130a is part of a multi-thread software application that is capable of parallel execution in coordination with other threads of the present invention. A "thread" is a part of the application that can execute independently of the other parts that may be executing simultaneously in this parallel mode. Parallel execution of threads in this embodiment of the present invention is accomplished by sharing as much as possible of the application execution between the different threads. Such a multi-threading embodiment increases the speed of the transfer of data in the present invention.

Listener object 130a establishes client socket connection 136 at well known port 132 requested by client computer system 102 on server computer system 110. When a user request 134 is received, listener thread 130a calls the session manager object 138a to create a new session thread and to start to handle the user request. After completing these tasks, listener object 130a returns to the task of listening for another incoming user request (e.g., another request from client computer system 102 or from another computer system in network 100 of FIG. 1A).

In the present embodiment, session manager object 138a of FIG. 2B spawns the session thread 140a that reads a command from the connection that is established by listener object 130a, parses the command, and executes it (refer also to FIG. 5, below). Session manager object 138a includes (tracks) information regarding all of the ongoing sessions.

A session 140a includes a channel object with multiple threads (e.g., channel 139a), over which the data are actually transferred. Channel object 139a is designed to transfer data in a secure manner. Additional information regarding channel object 139a is provided below in conjunction with FIGS. 3A, 3B, 4A and 4B.

With reference to FIG. 2B, for security purposes, only clients authorized to access data warehouse 113a and operational database 116a are allowed to receive data file 120. A protocol incorporated within the present invention is designed to authenticate that incoming request 134 originated at a client computer system 102 that is authorized to receive data file 120. Authentication protocols could include passwords, intelligent tokens, or other well-known techniques.

In the present embodiment, session manager object 138a provides the application program interfaces (APIs) for monitoring and managing sessions. An object is an application data item that includes instructions for the operations to be performed on it. After listener object 130a receives a user request 134, session manager object 138a receives a call from listener object 130a to create and start a session thread 140a for processing user commands. In this embodiment, session manager object 138a spawns session thread 140a.

Session manager object 138a provides the functionality to generate a unique identifier (ID) for a session, and to maintain logs of sessions for recovery purposes. The APIs provided by session manager object 138a include an API to create a session, an API to run the session, an API to stop the session by passing the session ID, an API to update the session's status by passing the session ID, an API to query session information, and an API to recover a failed session.

In the present embodiment, after session manager object 138a creates a new session, it assigns a unique ID to that session. Session manager object 138a saves (e.g., into an internal hash table) a session information object. Session manager object 138a, when it creates a new session, passes its own reference as an initialization parameter to the session. The session then uses this reference, in combination with its unique session ID, to invoke a session manager callback function to provide an update of its status information to session manager object 138a.

Thus, in the present embodiment of the present invention, listener object 130a of server 110 receives an incoming connection request 134 from client 102 and passes the incoming connection request to the session manager object 138*a*. Session manager object 138*a* of server 110 spawns session thread 140*a* that reads the command from the connection request 134 (e.g., a command requesting transfer of data file 120 of FIG. 2A). The command contains all of the information needed to open data file 120 and to send data file 120 through a connection between client 102 and server 110. The session thread 140*a* parses the command and creates and initializes a channel object 139*a* (with its threads), and runs the channel. Channel object 139*a* will be initialized with the currently established network connection between server 110 and client 102.

Channel object 139*a* represents the set of objects needed for sending a file (e.g., data file 120). In the present embodiment, the set of objects includes the reader, compressor, encryptor, and writer objects described in conjunction with FIGS. 3A and 4A.

On the client side, listener object 130*b* receives the incoming connection from server 110 and passes this connection to session manager 138*b*. Session manager 138*b* spawns a session thread 140*b*. Session thread 140*b* reads the command from the connection. This command contains all of the information needed to connect to server 110, read the data file 120, and to have the data file 120 sent to client 102. Session thread 140*b* parses the command and executes the following: establishes a connection with server 110, sends the command to start the transfer of data file 120, and initializes and runs the channel.

Figure 3A:
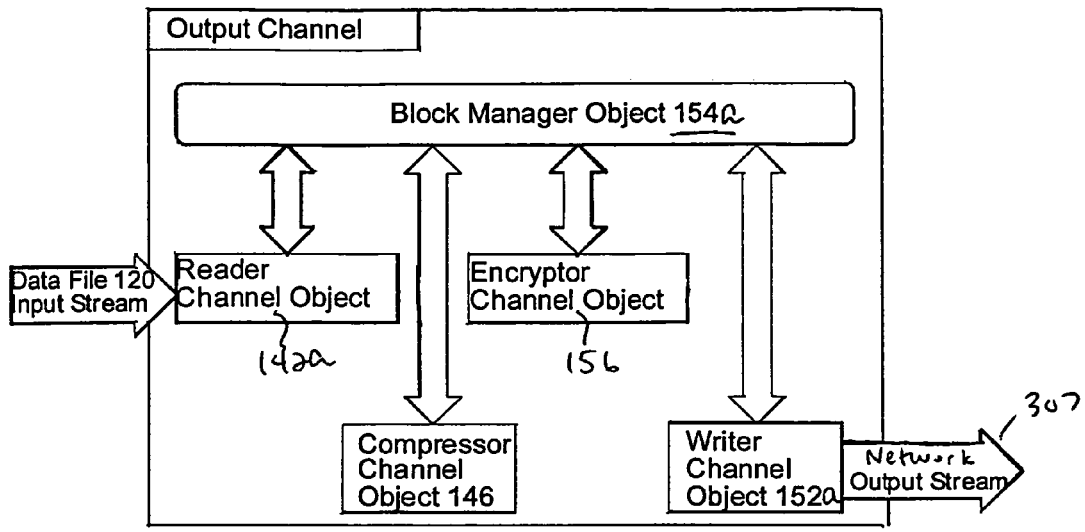
FIG. 3A illustrates data flow through a first embodiment of an output channel of the present invention.

FIG. 3A illustrates data flow through an embodiment of an output channel object 139*a* in accordance with the present invention. In this embodiment, output channel 139*a* comprises four data transformation threads or objects: reader channel object 142*a*, compressor channel object 146, encryptor channel object 156, and writer channel object 152*a*. The data transformers (reader channel object 142*a*, compressor channel object 146, encryptor channel object 156, and writer channel object 152*a*) can work in parallel (e.g., they each can have their own threads). Output channel 139*a* also comprises block manager object 154*a*.

Block manager object 154*a* contains multiple data blocks (e.g., vectors of data blocks). A data block is designed to store byte arrays between transformations. In the present embodiment, each data block is associated with one data transformation object, and only that object can write to the data block; however, a data transformation object may be associated with multiple data blocks. A size of a data block can vary, so that if a data transformation object finds that it cannot fit output data into the data block buffer, the data transformation object can create a new (larger) buffer that replaces the old (smaller) buffer. Also, for example, a data block containing compressed data can be smaller than one containing uncompressed data.

Block manager object 154*a* controls the total count of data blocks for each data transformation object; that is, the block manager object 154*a* has a parameter limiting the number of data blocks per data transformation object. Generally, about four data blocks are specified per data transformation object. If a data transformation object requests a data block, but the amount of available data blocks is equal to the maximum allowed for the transformation object (that is, there are no free data blocks), then block manager object 154*a* and the data transformation object will wait for a data block to be freed.

Referring still to FIG. 3A, in the present embodiment, reader channel object 142*a* reads a part of data file 120 and writes that part into a first data block buffer in the main memory of server computer system 110. Data file 120 is typically a large file. By reading a only a part of the file, downstream transformations relating to compression and encryption may commence in parallel, while subsequent parts of data file 120 are read and written to first data block buffer.

Compressor channel object 146 reads the data in the first data block buffer, transforms it (compresses it), and writes the compressed data to a second data block buffer. Compressor channel object 146 encodes the data contained in data file 120 in a way that makes it more compact.

Encryptor channel object 156 reads the compressed data from the second data block buffer, encrypts it, and writes it a third data block buffer.

Figure 3B:
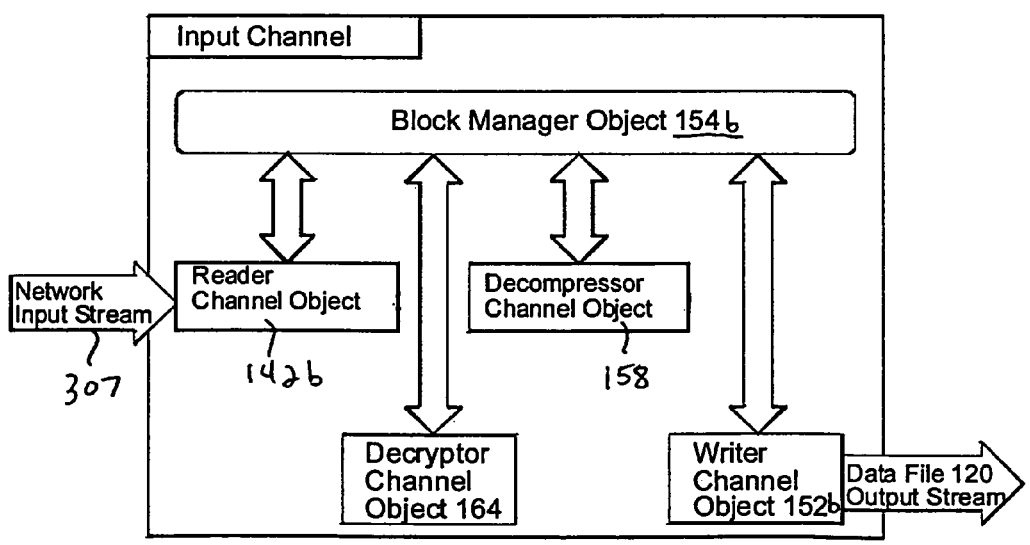
FIG. 3B illustrates data flow through a first embodiment of an input channel of the present invention.

Writer channel object 152*a* reads the encrypted data block and writes it to the network socket stream (to the input channel 139*b*; FIG. 3B).

In the present embodiment, output channel 139*a* functions as follows. Output channel 139*a* receives data file 120. Data file 120 may be received by output channel 139*a* in its entirety and then broken into smaller blocks of data, or data file 120 may be read from mass storage device 112 (FIG. 1A) a portion at a time.

Reader channel object 142*a* request a free data block. Block manager object 154*a* searches for the free data block, and if there is no such block, then block manager object 154*a* creates a new block, marks it as free, and assigns it to reader channel object 142*a*. Reader channel object 142*a* writes data from data file 120 to the data block and marks the data as ready for compression. Compressor channel object 146 receives this data block from block manager object 154*a* and requests a free block (for its output). Block manager object 154*a* creates a new data block, marks it as free, and assigns it to compressor channel object 146.

In parallel, reader channel object 142*a* requests another data block, and as described above, block manager 154*a* creates a new block, marks it as free, and assigns the new data block to reader channel object 142*a*. Reader channel object 142*a* can then write another portion of data file 120 to this block and mark it as ready for compression.

In the meantime, compressor channel object 146 compresses (encodes) the data contained in its respective data block, marks it as ready for encryption, and frees its respective data block. Encryptor channel object 156 receives this (compressed) data block from block manager object 154*a* and requests a free block for its output. Block manager object 154*a* creates a new data block, marks it as free, and assigns it to encryptor channel object 156.

Encryptor channel object 156 encrypts the data contained in its respective data block, marks it as ready for ready for writing, and frees its respective data block. Writer channel object 152*a* receives the encoded (compressed) and encrypted data block from block manager object 154*a* and writes to the network socket output stream 307.

The process described above is repeated until the reader channel object 142*a* reads the last block of data in data file 120. Each block of data is stepped through output channel 139*a*, with data blocks being created and freed as needed by the respective transformation objects. In this manner, the number of data blocks can be reduced so that memory resources are not unduly consumed.

In this embodiment of the present invention, means well known to those of ordinary skill in the art are utilized to verify that data file 120 was completely and accurately transmitted to client 102.

Thus, the goals of the present invention are achieved. A data file 120 is sent on request from server computer system 110 to at least one computer system remote from server computer system 110 (e.g., client 102). The data transfer is accomplish securely, rapidly, and reliably.

FIG. 3B illustrates data flow through an embodiment of an input channel 139b of the present invention. As shown in FIGS. 2B and 3B, in another aspect of the present invention, the operations of server computer system 110 may be mirrored on the client computer system 102. A network stream of compressed/encrypted data blocks 307 are received from server computer system 110 by client computer system 102 and are decrypted, decompressed, and ultimately assembled into data file 120. Alternatively, the data blocks may received by client 102 en masse from server 110.

On the client side, reader channel object 142b reads formatted (encrypted and compressed) data from network input stream 307. A decryptor channel object 164 reads data from a data block in block manager object 154b, decrypts the data, and writes the data to a data block in block manager object 154b.

A decompressor channel object 158 reads data from a data block in block manager object 154b, decompresses (decodes) the data, and writes the data to a data block in block manager object 154b. Writer channel object 152 writes the data to the data file 120 output stream to mass storage device 170 (FIG. 2A), for example.

The data transformers (reader channel object 142b, decryptor channel object 164, decompressor channel object 168, and writer channel object 152) function similar to that described above in conjunction with FIG. 3A. Means well known to those skilled in the art can be utilized to verify that data file 120 was completely and accurately transmitted.

Thus, the goals of the present invention are again achieved in the client-side embodiment of the present invention. A data file 120 is sent on request of client computer system 102 from server computer system 110 to client computer system 102. The data transfer is accomplished securely, rapidly and reliably.

The forgoing discussion illustrates a "pull" of data from the server computer system 110 by client server system 102. As can be appreciated, in another aspect of the present invention, data transfer could be accomplished by "push" of data from the server computer system 110 wherein, server computer system 110 would command a "listening" client computer system 102 to receive data. Appropriate socket connections, threads, and objects would be created in accordance with the present invention, and data would be transfer over the computer network from the server computer system 110 to the client computer system 102.

Figure 4A:
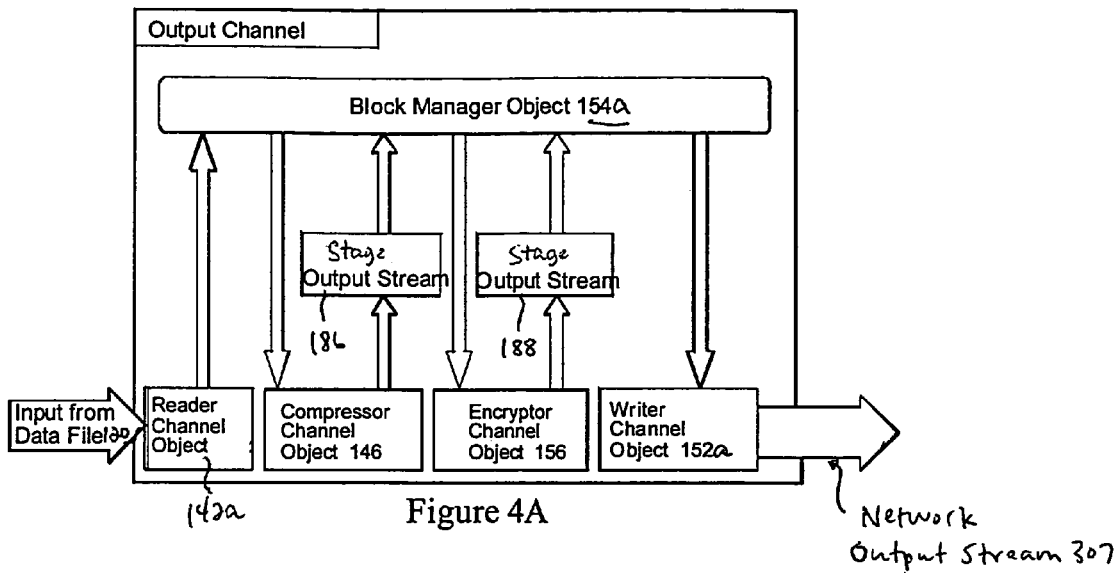
FIG. 4A illustrates data flow through a second embodiment of an output channel of the present invention.
Figure 4B:
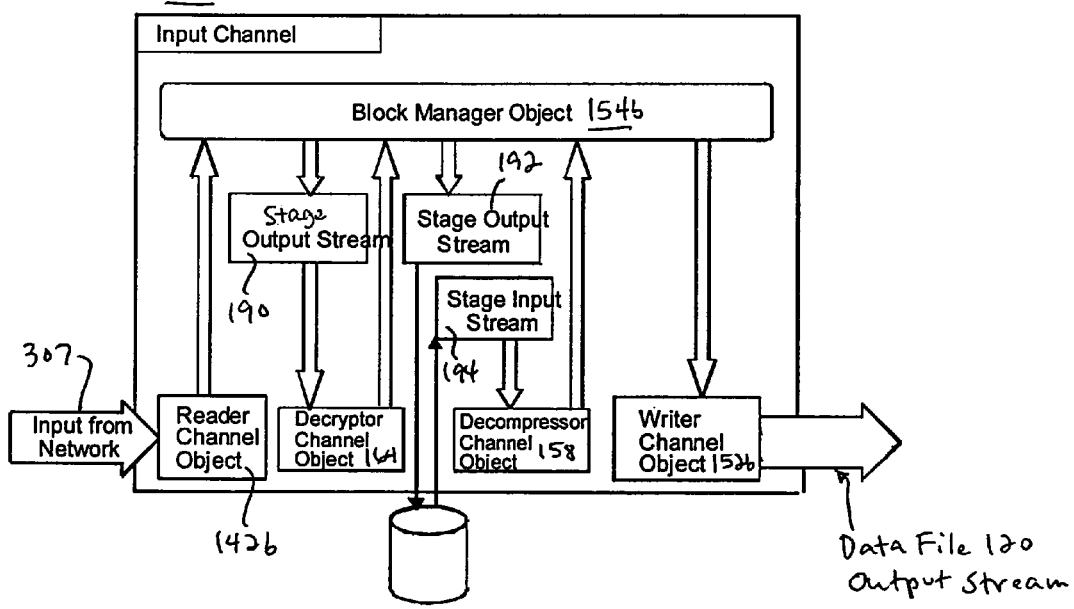
FIG. 4B illustrates data flow through a second embodiment of an input channel of the present invention.

FIGS. 4A and 4B illustrate alternative embodiments of output channel 139a and input channel 139b of FIGS. 3A and 3B (the alternative embodiments are designated output channel 122 and input channel 124). The operation and function of numbered elements in FIGS. 4A and 4B is the same as like numbered element in FIGS. 3A and 3B, respectively.

In the embodiment of FIG. 4A, a streaming mechanism is used for compressing data file 120, encrypting data file 120, and then sending data file 120 over the network to the client 102 or another remote device. Thus, instead of dividing the file into blocks as described above in conjunction with FIG. 3A, and treating each block as a small file, the file can instead be treated as a contiguous file.

The compressor channel object 164 and the encryptor channel object 156 may produce an output that is different in size from their input. The stage output streams 186 and 188 write data to an output data block buffer until that block is full, or until there is no more data to write. If the current output data block is full, then output streams 186 and 188 indicate that the current block is ready to be read by the next transformation object, and asks block manager object 154a for the next available output data block. By accumulating streaming parts of data file 120 from compressor channel object 146 and encryptor channel object 156, better management of data block buffers by block manager object 154 may be realized.

For example, compressor channel object 146 may be capable of a 10:1 compression ratio. Instead of specifying an output data block buffer size equal to one-tenth the size of the input buffer, better use of the data block buffers may be achieved by accumulating ten parts of compressed data blocks in the stage output stream 186 before writing to the output data block buffer, so that the output buffer is sized the same as the input buffer size.

In FIG. 4B, similar to the discussion above, stage output stream 190 and stage output stream 192 accumulate data for decryptor channel object 164 and decompressor channel object 158, respectively. Additionally, stage input stream 194 is provided in input channel 124 to receive the entire stream of compressed data blocks until the end of data file 120 is reached, because decompressor channel object 168 may require a complete compressed data file 120 in order to operate.

Figure 5:
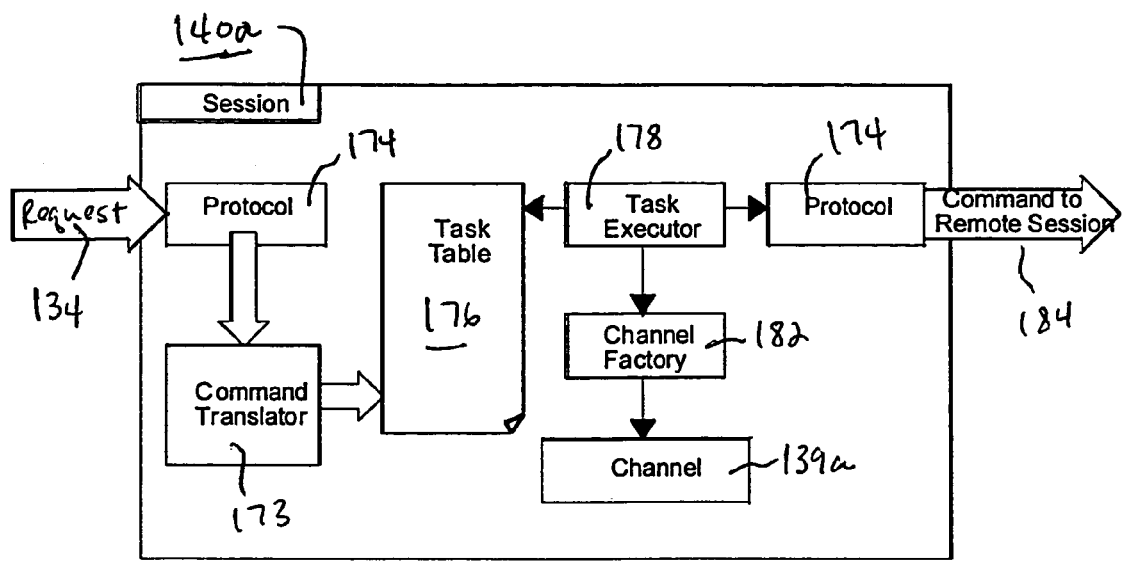
FIG. 5 illustrates data flow through one embodiment of a session thread in accordance with the present invention.

FIG. 5 illustrates data flow through one embodiment of a session thread 140a in a server computer system 110 (FIG. 2B) in accordance with the present invention. It is appreciated that a similar data flow occurs through a session thread 140b in a client computer system 102 (FIG. 2B). Session threads 140a and 140b are executed under direction of the session manager objects 138a and 138b, respectively (refer to FIG. 2B).

Referring to FIG. 5, a session thread 140a is created for each incoming request 134. Requests can include commands such as status commands, commands to send one or more files (e.g., data file 120) to one or more remote devices (e.g., client 102), and commands to receive one or more files from a remote device. In one embodiment, the commands in request 134 use the Extensible Markup Language (XML).

In this embodiment, protocol 174 validates incoming request 134 and directs it to XML command translator 173. Protocol 174 is used to send and receive commands in an encrypted format, and is used for authentication. Protocol 174 is used by channel factory 182 to open a communication socket for a channel (e.g., input channels 139b or 124, or output channels 139a or 122 of FIGS. 3B, 4B, 3A and 4A, respectively).

Continuing with reference to FIG. 5, XML command translator object 173 parses the incoming request 134, generates optimized low-level internal tasks, and inserts the tasks with associated parameters into task table 176. Each parameter is passed to all of the tasks that require it using the "declare" task (mentioned below), so that when a parameter is declared, it is shared at multiple locations and in multiple tasks where it is needed.

Incoming request 134 is translated into low-level incoming tasks because the number of these tasks can be limited, while the number of XML commands in incoming request 134 could be large. However, the XML commands can be translated into low-level internal tasks to facilitate implementation and to make the implementation more extensible. Also, use of low-level internal tasks instead of XML commands facilitates parallel processing and avoids the need for redundant processing steps.

The low-level internal tasks include but are not limited to the following:

Connect: to establish a connection between two devices (e.g., server 110 and client 102), to create and initialize protocol 174, and to pass an initialization command to session manager object 138*a*;

Create Channel: to create and initialize a channel;

Run Channel: to perform the file transfer;

External Execute: to execute an external command on the local device;

Get Session Status: to get a status report on one or more sessions;

Stop Session: to stop a session;

Declare: to insert a row in a separate variable vector maintained by task executor 178 (the variable vector provides a mechanism to share objects across multiple tasks);

Wait: to wait until a channel has finished transferring a file or files;

Terminate: to terminate a session;

Create Account: to create a new account;

Edit Account: to edit an existing account; and

Remove Account: to remove an existing account.

XML command translator 173 places these tasks into task table 176 for execution by task executor 178. Task table 176 is a memory object and comprises a hash table of the tasks.

Task executor 178 executes the tasks from task table 176 in a given order. Task executor 178 uses an API of session manager object 138*a* (Figure 2B) to execute the tasks. Task executor 178 executes in a loop through task table 176 until terminate command is found. Once XML command translator 173 creates a task table 176 for a command 141, task executor 178 takes control of the session thread and starts executing the tasks in the session thread. Task executor 178 also updates session statistics for the recovery option described below in conjunction with FIGS. 6A, 6B, and 6C.

With reference to FIG. 5, a channel object (e.g., channel object 139*a*, and also channel object 122 of FIG. 4A) is generated and initialized by a channel factory 182. In the present embodiment, channel factory 182 initializes channel object 139*a* with input and/or output streams.

Continuing with reference to FIG. 5, channel object 139*a* represents the set of data transformation objects needed for sending and receiving a file (e.g., data file 120). In the present embodiment, the set of data transformation objects includes the reader, compressor, encryptor, decompressor, decryptor, and writer objects described in conjunction with FIGS. 3A–3B and 4A–4B. Protocol 174 direct executed tasks to a remote session 184.

Figure 6A:
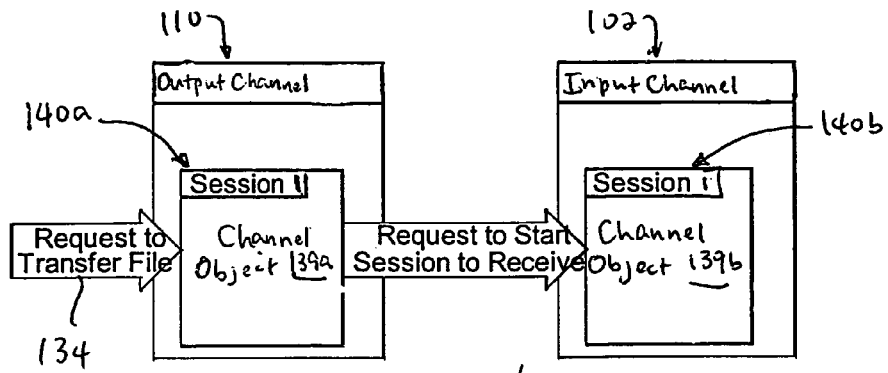
FIGS. 6A, 6B, and 6C illustrate data transfer recovery after a failure of a network connection in accordance with one embodiment of the present invention.
Figure 6B:
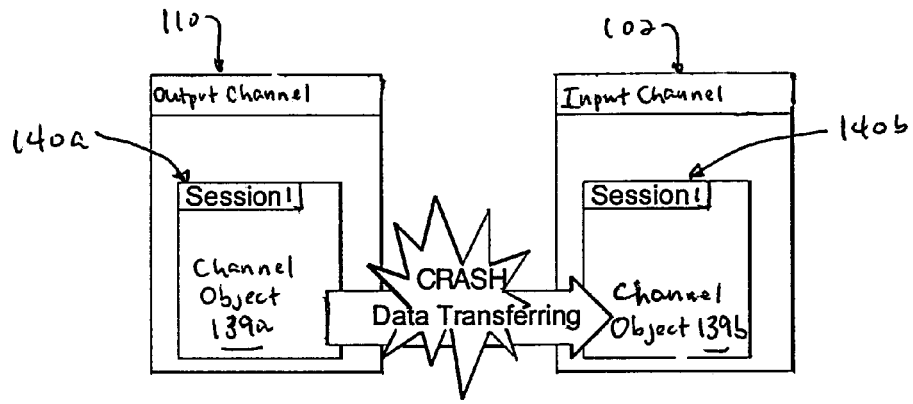
Figure 6C:
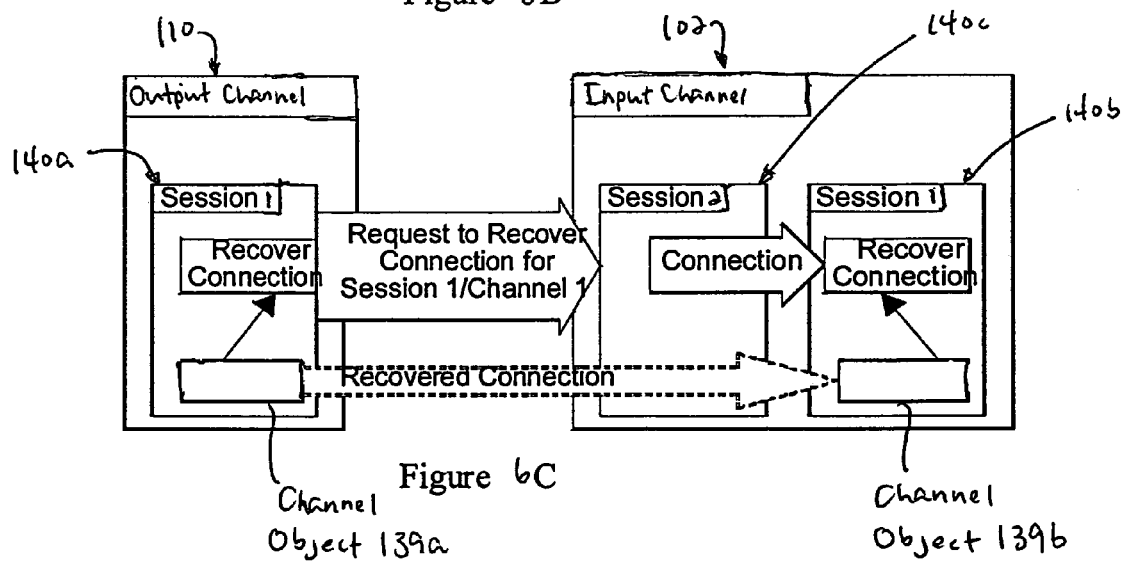

FIGS. 6A, 6B and 6C illustrate another aspect of the present invention relating to data transfer recovery after a temporary loss and/or failure of a network connection. Because large amounts of data are being transferred in accordance with the present invention, recovery is an important consideration. In the present embodiment, two recovery modes are considered: automatic network connection recovery, and manual session recovery.

Automatic network connection recovery means that both the input channel 139*b* and the output channel 139*a* (FIG. 2B) are running but the network connection is lost or has failed. In this case, the network connection can be recovered automatically.

When a network connection fails, both channels get notification via an "exception." When a channel receives an exception, it calls the API for its respective session manager (e.g., session manager object 138*a* or 138*b* of FIG. 2B) to restore the connection. The API returns a new session thread for the connection if the connection can be restored, or a NULL if the connection cannot be restored.

Referring to FIGS. 6A, 6B and 6C, there are two session threads involved with the recovery process. In FIG. 6A, session manager object 138*a* (FIG. 2B) creates session 1 (e.g., session thread 140*a*) on server computer system 110 and initiates the connection with client computer system 102. Session manager object 138*b* (FIG. 2B) receives the request to start a session and creates session 1 (e.g., session thread 140*b*) on client computer system 102.

In FIG. 6B, the connection is lost. In FIG. 6C, once the connection is lost and the initiating session manager (session manager object 138*a* on server 110) gets called to recover the session, session manager object 138*a* sends a request to client 102 (session manager object 138*b*) to restore the network connection for session 1. When client 102 (specifically, session manager object 138*b*) receives the request from server 110, it spawns a second session thread (session 2, e.g., session thread 140*c*). Session 2 passes the connection to the waiting session 1 on client 102. Once the connection is restored, both channels (output channel 139*a* and input channel 139*b*) continue to transfer data from the point at which they stopped.

Information about a session is stored in session manager objects 138*a* on server 110. Session manager 138*a* stores all session parameters and the count of bytes of data written in session 1 before the failure. Accordingly, reading can start reading from the correct byte offset, and writing can proceed by appending those data blocks created but not yet sent.

In the recovery mode, task table 176 (FIG. 5) contains the same tasks but, when executed, some of the tasks may be skipped depending on the results of previous task execution and settings.

Manual session recovery is used when either of the channels fails. Recovery typically does not occur automatically because it is desirable to first determine and resolve the cause of the failure.

Figure 7A:
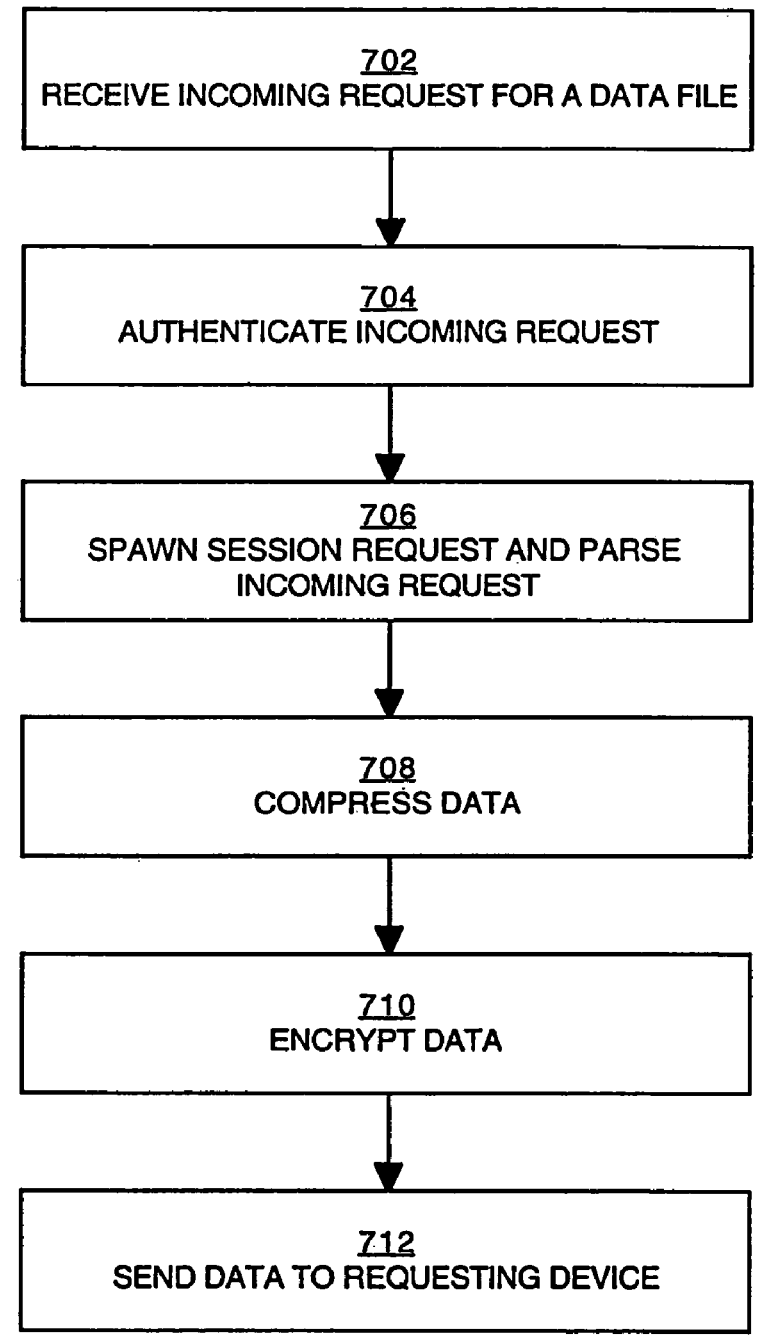
FIG. 7A is flowchart of the steps in a server-side process for transferring data over a network in accordance with one embodiment of the present invention.

FIG. 7A is a flowchart of the server side steps in a process 700 for transferring data over a network 100 (FIG. 1A) in accordance with one embodiment of the present invention. In this embodiment, process 700 is implemented by a server computer system 110 (FIG. 1A), exemplified by computer system 1090 (FIG. 1B), as computer-readable instructions stored in a memory unit (e.g., ROM 1003, RAM 1002 or data storage device 1004 of FIG. 1B) and executed by a processor (e.g., processor 1001 of FIG. 1B). However, it is appreciated that some aspects of process 700 may be implemented on server computer system 110 with other aspects of the process 700 performed on client computer system 102 (FIG. 1A).

In step 702 of FIG. 7A, server 110 receives a request 134 (FIG. 2B) for a data file residing in a mass storage unit on the server (e.g., data file 120 residing in mass storage device 112 of FIG. 1A). In one embodiment, a listener object 130*a* (FIG. 2B) is listening for such a request. In the present embodiment, the request 134 includes commands; refer to FIG. 5. In one embodiment, request 134 uses XML.

In step 704 of FIG. 7A, the request 134 is authenticated to make sure that the request is from an authorized user. In one embodiment, protocol 174 (FIG. 5) validates incoming request 134.

In step 706 of FIG. 7A, a session thread (e.g., session thread 140*a*) is spawned in response to the user request 134 (FIG. 2B). In one embodiment, listener object 130*a* (FIG. 2B) calls session manager object 138*a* (FIG. 2B), and session manager object 138*a* creates session thread 140*a* and assigns a unique ID to it. Session thread 140*a* reads the command(s) contained in the user request 134, and translates the request 134 into a set of low-level incoming tasks that are to be executed for session thread 140a (refer to FIG. 5). Session manager 138a also sends a message to client 102 directing it to spawn a session thread (e.g., session thread 140b). A channel object 139a is also generated, providing the set of data transformation objects needed for sending and receiving data file 120; refer to FIGS. 3A and 4A.

In step 708 of FIG. 7A, the data in data file 120 are read from server mass storage device 112 (FIG. 1A) and compressed as described in conjunction with either FIG. 3A or FIG. 4A.

In step 710 of FIG. 7A, the compressed data are encrypted as described in conjunction with FIG. 3A or FIG. 4A.

In step 712 of FIG. 7A, the data are sent to the requesting device (e.g., to client 102 over network bus 101 in network 100 of FIG. 1B), and complete and accurate data transfer are verified.

Steps 708, 710 and 712 are performed in parallel for different parts of the data file 120.

Figure 7B:
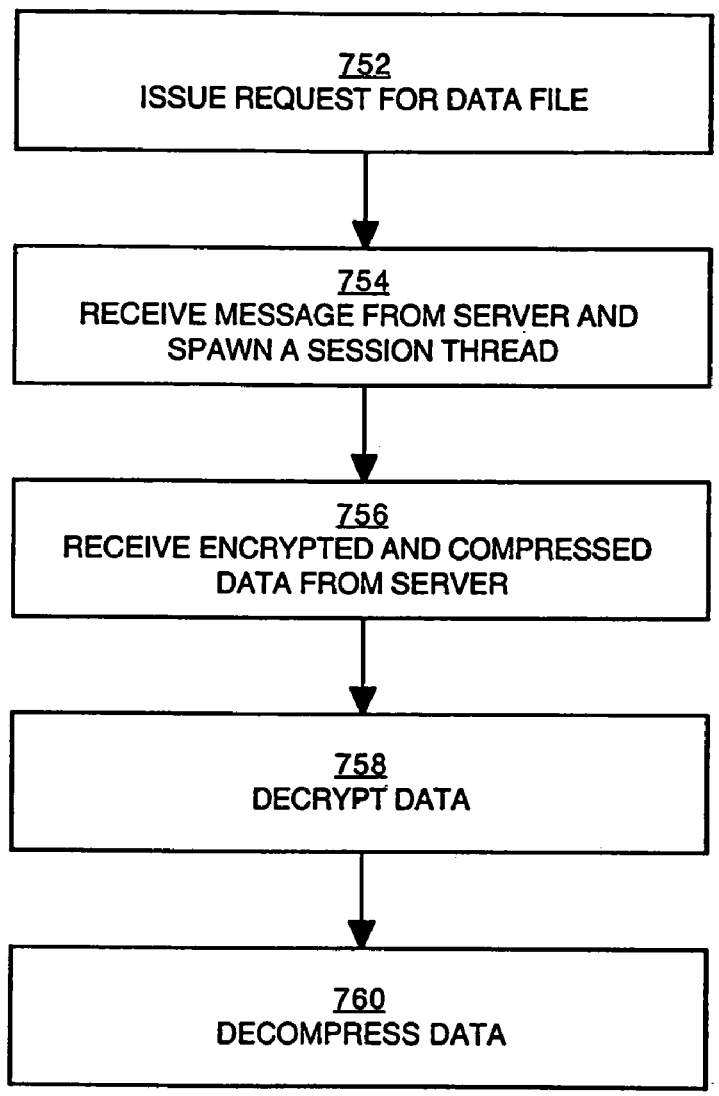
FIG. 7B is flowchart of the steps in a client-side process for transferring data over a network in accordance with one embodiment of the present invention.

FIG. 7B is a flowchart of the client side steps in a process 750 for transferring analytical data over a network in accordance with one embodiment of the present invention. In this embodiment, process 750 is implemented by client computer system 102 (FIG. 1A), exemplified by computer system 1090 (FIG. 1B), as computer-readable instructions stored in a memory unit (e.g., ROM 1003, RAM 1002 or data storage device 1004 of FIG. 1B) and executed by a processor (e.g., processor 1001 of FIG. 1B). However, it is appreciated that some aspects of process 750 may be implemented on client computer system 102 with other aspects of the process 750 performed on server computer system 110.

In step 752 of FIG. 7B, a requesting device (e.g., client 102 of FIG. 1A) issues a request 134 (FIG. 2B) to a server (e.g., server 110 of FIG. 1A) for a data file 120 (FIG. 1A).

In step 754 of FIG. 7B, client 102 receives from server 110 (specifically, from session manager object 138a of FIG. 2B) a message directing client 102 to spawn a session thread (e.g., session thread 140b of FIG. 2B).

In step 756 of FIG. 7B, client 102 receives from server 110 encrypted and compressed data blocks that represent data file 120; refer to FIG. 3B or FIG. 4B.

In step 758 of FIG. 7B, the data are decrypted as described by FIG. 3B or FIG. 4B.

In step 760 of FIG. 7B, the data are decompressed as described by FIG. 3B or FIG. 4B.

Steps 756, 758 and 760 are performed in parallel for different parts of the data file 120.

In summary, the present invention provides a reliable, secure, authenticated, verifiable, and rapid system and method for the transmission of huge amounts of data over a network, such as the data used in an analytic application (e.g., operational data, and transformed data in a data warehouse/data mart).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a multithreaded analytic application executed by a source computer system and capable of concurrent execution of multiple session threads, a method for transferring data, the method comprising:

receiving an incoming request for analytic data resident in a mass storage unit on the source computer system;

authenticating the incoming request;

spawning a session thread that reads and parses a command received via the incoming request, the command for sending the data to a second computer system; and concurrently executing a plurality of data transformation threads within the session thread, comprising a reader thread that reads data and writes at least a part of the data to a first data block buffer;

a compressor thread that compresses the part of the data in the first data block buffer into a compressed data block and writes the compressed data block to a second data block buffer;

an encryptor thread that encrypts the compressed data block in the second data block buffer into an encrypted and compressed data block and writes the encrypted and compressed data block to a third data block buffer; and a writer thread that reads the encrypted and compressed data block in the third data block buffer and sends the encrypted and compressed data block to the second computer;

restoring a connection with the second computer system when an ongoing connection is lost; and resuming transfer of data to the second computer system at the point in the data where the ongoing connection was lost.

2. The method of claim 1 further comprising:
verifying that data transfer to the second computer system is complete.

3. The method of claim 1 further comprising:
verifying that data transfer to the second computer system is without error.

4. The method of claim 1 wherein the source computer system and the second computer system are networked via the Internet.

5. The method of claim 1 wherein the data comprises data processed by an analytic application.

6. The method of claim 1 wherein the incoming request uses Extensible Markup Language (XML).

7. The method of claim 1 wherein spawning a session thread further comprises:
translating the command into a plurality of tasks;
storing the tasks in a task table in a given order; and
executing the tasks in order until a task ending the session thread is found.

8. The method of claim 1 wherein the first data block buffer and the second data block buffer are substantially equal in size and wherein enough compressed data blocks are accumulated to fill the second data block buffer before the compressor thread writes to a second data block buffer.

9. The method of claim 1 wherein the second data block buffer and the third data block buffer are substantially equal in size and wherein enough encrypted and compressed data blocks are accumulated to fill the third data block buffer before the encryptor thread writes to the third data block buffer.

10. In a first multithreaded analytic application executed by a target computer system and capable of concurrent execution of multiple session threads, a method for receiving data transferred from a source computer, the method comprising:

issuing a request for data to the source computer system on which the data resides, the source computer system executing a second multithreaded analytic application;

spawning a session thread in response to a message from the source computer system;

receiving from the source computer system at least one encrypted and compressed data block of the data; and concurrently executing a plurality of data transformation threads within the session thread, comprising a reader thread for writing the encrypted and compressed data block to a first data block buffer;

a decryptor thread for decrypting the encrypted and compressed data block into a compressed data block and writing the compressed data block to a second data block buffer; and a decompressor thread for decompressing the compressed data block in the second data block buffer and writing a resultant data block to a third data block buffer;

restoring a connection with the source computer system when an ongoing connection is lost; and resuming transfer of data from the source computer system at the point in the data where the ongoing connection was lost.

11. The method of claim 10 further comprising:
verifying that data transfer from the source computer system was complete.

12. The method of claim 10 further comprising:
verifying that data transfer from the source computer system was without error.

13. The method of claim 10 wherein the target computer system and the source computer system are networked via the Internet.

14. The method of claim 10 wherein the data comprises data processed by an analytic application.

15. The method of claim 10 wherein a plurality of encrypted and compressed data blocks accumulate before the decryptor thread executes.

16. The method of claim 10 wherein a plurality of compressed data blocks accumulate before the decompressor thread executes.

17. A source computer system comprising:
a bus;
a memory unit coupled to the bus; a multithreaded analytic application stored in the memory unit, and comprising:
a listener object for receiving an incoming request for data resident in a mass storage unit on the source computer system;
protocol for authenticating the incoming request;
a session manager object for spawning a session thread that reads and parses a command received via the incoming request, the command for sending the data to a second computer system;
a reader channel object for reading data and writing at least a part of the data to a first data block buffer;
a compressor channel object for compressing the part of the data in the first data block buffer into a compressed data block and writing the compressed data block to a second data block buffer;
an encryptor channel object for encrypting the compressed data block in the second data block buffer into an encrypted and compressed data block and writing the encrypted and compressed data block to a third data block buffer; and a writer channel object for reading the encrypted and compressed data block in the third data block buffer and sending the encrypted and compressed data block to the second computer, wherein the application executes the reader channel object, the compressor channel object, the encryptor channel object, and the writer channel object concurrently; and a processor coupled to the bus, the processor configured for executing the multithreaded analytic application, wherein the processor is further configured for:
restoring a connection with the second computer system when an ongoing connection is lost; and
resuming transfer of data to the second computer system at the point in the data where the ongoing connection was lost.

18. The source computer system of claim 17 wherein the processor is further configured for verifying that data transfer to the second computer system is complete.

19. The source computer system of claim 17 wherein the processor is further configured for verifying that data transfer to the second computer system is without error.

20. The source computer system of claim 17 wherein the source computer system and the second computer system are networked via the Internet.

21. The source computer system of claim 17 wherein the data comprises data processed by an analytic application.

22. The source computer system of claim 17 wherein the incoming request uses Extensible Markup Language (XML).

23. The source computer system of claim 17 wherein the session manager object is further configured for:
translating the command into a plurality of tasks;
storing the tasks in a task table in a given order; and
executing the tasks in order until a task ending the session thread is found.

24. The source computer system of claim 17 wherein the first data block buffer and the second data block buffer are substantially equal in size and wherein the compressor channel object is further configured for:
accumulating compressed data blocks before data are written to the second data block buffer, wherein enough compressed data blocks are accumulated to fill the second data block buffer.

25. The source computer system of claim 17 wherein the second data block buffer and the third data block buffer are substantially equal in size and wherein the encryptor channel object is further configured for:
accumulating encrypted and compressed data blocks before data are written to the third data block buffer, wherein enough encrypted and compressed data blocks are accumulated to fill the third data block buffer.

26. A target computer system comprising:
a bus;
a memory unit coupled to the bus;
a multithreaded analytic application stored in the memory unit, and comprising:
a first session thread for issuing a request for data to a source computer system on which the data resides;
a session manager object for spawning a session thread in response to a message from the source computer system;
a listener object for receiving from the source computer system at least one encrypted and compressed data;
a reader channel object for reading data and writing at least part of the encrypted and compressed data to a first data block buffer;

a decryptor channel object for decrypting the encrypted and compressed data block into a compressed data block and writing the compressed data block to a second data block buffer; and a decompressor channel object for decompressing the compressed data block in said the second data block buffer and writing a resultant data block to a third data block buffer, wherein the application executes the reader channel object, the decryptor channel object, and the decompressor channel object concurrently; and a processor coupled to the bus, the processor configured for executing the multithreaded analytic application, wherein the processor is further configured for:

restoring a connection with the source computer system when an ongoing connection is lost; and resuming transfer of data from the source computer system at the point in the data where the ongoing connection was lost.

27. The target computer system of claim 26 wherein the processor is further configured for verifying that data transfer from the source computer system was complete.

28. The target computer system of claim 26 wherein the processor is further configured for verifying that data transfer from the source computer system was without error.

29. The target computer system of claim 26 wherein the target computer system and the source computer system are networked via the Internet.

30. The target computer system of claim 26 wherein the data comprises data processed by an analytic application.

31. The target computer system of claim 26 wherein the decryptor channel object is further configured for accumulating encrypted and compressed data blocks before decrypting the encrypted and compressed data blocks.

32. The target computer system of claim 26 wherein the decompressor channel object is further configured for accumulating compressed data blocks before decompressing the compressed data blocks.

* * * * *